(12) United States Patent
Laster et al.

(10) Patent No.: US 8,078,167 B2
(45) Date of Patent: *Dec. 13, 2011

(54) LOCAL NUMBER PORTABILITY FOR MOBILITY MANAGEMENT

(75) Inventors: Maurice Scott Laster, Alpharetta, GA (US); Mark Enzmann, Roswell, GA (US); John Mark Dammrose, Woodinville, WA (US); Annie Nguyen, Kirkland, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/648,011

(22) Filed: Dec. 28, 2009

(65) Prior Publication Data

US 2010/0098241 A1 Apr. 22, 2010

Related U.S. Application Data

(63) Continuation of application No. 11/620,453, filed on Jan. 5, 2007, now Pat. No. 7,664,496.

(60) Provisional application No. 60/807,413, filed on Jul. 14, 2006.

(51) Int. Cl.
*H04W 4/00* (2009.01)
(52) U.S. Cl. ............................. 455/433; 379/221.13
(58) Field of Classification Search ............. 379/221.13; 455/433
See application file for complete search history.

(56) References Cited

U.S. PATENT DOCUMENTS

| | | | |
|---|---|---|---|
| 6,226,517 B1 | 5/2001 | Britt et al. | |
| 6,466,792 B1* | 10/2002 | Copley | 455/445 |
| 7,254,391 B2 | 8/2007 | McCann | |
| 2003/0181206 A1 | 9/2003 | Zhou et al. | |
| 2005/0186950 A1 | 8/2005 | Jiang | |
| 2006/0052110 A1* | 3/2006 | Xu et al. | 455/445 |
| 2006/0079236 A1 | 4/2006 | Del Pino et al. | |
| 2006/0293021 A1 | 12/2006 | Zhou et al. | |
| 2007/0140158 A1* | 6/2007 | Schwarzbauer et al. | 370/328 |

* cited by examiner

*Primary Examiner* — Jinsong Hu
*Assistant Examiner* — Michael Nguyen
(74) *Attorney, Agent, or Firm* — Parks IP Law LLC; Mickki D. Murray, Esq.

(57) ABSTRACT

A mobility management analysis architecture for call management. Systems and methods are provided for routing of a landline-mobile and mobile-mobile call using a switching network (landline or mobile originating) to serve effectively as the "GMSC/tandem" switching layer for the mobile network, as well as for mobile-mobile calls using an originating switch. When a landline switch issues an local number portability (LNP) query, the response to the query can be intercepted by a preliminary mobility management platform that determines a location routing number (LRN) for a visited mobile switching center (V-MSC) to which a destination mobile handset is currently attached. The LRN for that V-MSC is returned in the LNP response to the switch, which then routes the call to the serving V-MSC based on the LRN. The V-MSC then performs the GMSC (gateway mobile switching center) functionality, for example, for that particular call.

7 Claims, 11 Drawing Sheets

LOCAL NUMBER PORTABILITY FOR MOBILITY MANAGEMENT

CROSS-REFERENCE TO RELATED APPLICATIONS

This application is a continuation of U.S. application Ser. No. 11/620,453, filed Jan. 5, 2007 now U.S. Pat. No. 7,664,496 which claims the benefit of U.S. Provisional Patent Application Ser. No. 60/807,413 filed Jul. 14, 2006, the entirety of which is incorporated by reference herein.

TECHNICAL FIELD

This invention relates to telecommunication systems, and more specifically, to call processing between landline and mobile networks.

BACKGROUND

Local number portability (LNP), as defined in the Telecommunications Act of 1996, is "the ability of users of telecommunications services to retain, at the same location, existing telecommunications numbers without impairment of quality, reliability, or convenience when switching from one telecommunications carrier to another".

With the convergence of landline and mobile (cellular) telecommunications networks, the management of call routing between landline and cellular infrastructures, referred to as "mobility management", presents a challenge to carriers.

Traditionally, landline networks and mobile networks have been operated by separate companies resulting in disparate operations across the networks. Landline switches perform LNP analysis to determine whether a landline-originated call needs to be routed to a mobile network. If yes, then the call is routed to a gateway mobile switching center (GMSC). The GMSC then queries a mobility management database (e.g., a home location register (HLR)), which maintains the identity of a visited MSC (V-MSC) to which the mobile subscriber is currently attached. The database (e.g., the HLR) then queries the V-MSC to obtain a temporary routing number, called a mobile subscriber routing number (MSRN), for that particular call. Thereafter, the MSRN number is returned to the GMSC, the GMSC then routes the call to that MSRN, and the V-MSC associates the incoming call to the MSRN with the destination mobile subscriber.

A similar technique is typically used for mobile-originated calls to a destination mobile subscriber. The originating MSC performs LNP analysis and then routes the call to the GMSC, which GMSC performs the HLR interrogation and receives an MSRN so that the GMSC can complete the call to the V-MSC. This design results in the landline switching network and the originating MSCs having one or more direct connections (called trunk groups) to the GMSC to transport the calls to the GMSC.

In the reverse scenario for mobile-originated calls to landline destinations, the originating MSC performs LNP analysis and determines that the destination number is on the landline network. Since landline phone connections are permanently affixed to a particular landline switch, there is no need for mobility management analysis to determine the current switch serving the destination landline number. Thus, the originating MSC typically has a direct trunk group to the landline switching network, because it would be inefficient, costly, and unnecessary to route the call through the GMSC.

As landline and wireless telecommunications networks converge into one company, there are inefficiencies with the traditional approach. The traditional approach requires multiple trunk groups from the landline network to the GMSC, landline network to originating MSCs, and originating MSCs to GMSCs. These multiple trunk groups are expensive from a transport and switching perspective. Further, the inability of the landline network to perform any mobility management analysis requires the continued expenditure of capital on GMSC equipment.

The landline switches utilize the traditional signaling protocols to support LNP analysis and intelligent network (IN) services. However, landline switches do not support the mobile application part (MAP) signaling protocols necessary to query the HLR, and thus, to support mobility management. It can be very expensive and time-consuming to facilitate an upgrade the traditional landline switches to support MAP signaling. Further, it is inefficient from a capital expenditure perspective to upgrade these switches given the pending evolution to voice over IP (VoIP) soft switches.

Additionally, conventional mobility management attempts do not support the CAMEL (customized application for mobile enhanced logic) signaling protocol that is utilized between GMSCs and service control points (SCPs) to provide specialized mobility services such as prepaid cellular service, personalized audible ringing service, and other special services that require signaling interaction for mobile-terminated calls. Moreover, conventional mobility management attempts do not provide the traditional GMSC call detail record (CDR) that is oftentimes required by IT (information technology) billing systems either as the primary billing record or as used in reconciling with V-MSC CDR before it is used as the primary billing record. Accordingly, alternative and more effective means for performing mobility management and analysis are desirable.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The disclosed novel architecture facilitates the utilization of number portability to perform mobility management analysis in telecommunications networks. A preliminary mobile management (PMM) component is positioned to intercept a local number portability (LNP) query from a switch (e.g., landline or mobile originating) and/or LNP response to the query that determines a location routing number (LRN) for a visited mobile switching center (V-MSC) (or servicing V-MSC) to which a mobile subscriber is currently attached. The LRN for the V-MSC is returned in the LNP response to the switch, which then routes the call to the servicing V-MSC based on the V-MSC LRN. The V-MSC then performs the GMSC functionality for that particular call.

In yet another aspect, the LNP query is only utilized to perform PMM analysis to route the call to the proper V-MSC for the destination mobile subscriber. The V-MSC is then allowed to perform the traditional mobility management signaling such as HLR interrogation and CAMEL (customized application of mobile enhanced logic) triggers for special services such as prepaid accounting and other special cellular services.

In still another aspect thereof, selective implementation of PMM can be obtained for application to local calls only.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

The disclosed call architecture overcomes a limitation in conventional call infrastructures by providing for full mobility management by supporting home location register (HLR) interrogation and/or CAMEL (customized application of mobile enhanced logic) queries. The architecture facilitates interception of a local number portability (LNP) query (or "dip" into the database) and then determines a visited mobile switching center (V-MSC) local routing number (LRN), which is essentially the "global" address for the V-MSC. The call is then routed to the V-MSC, where HLR interrogation and/or the CAMEL queries are performed. Accordingly, the innovation performs a preliminary mobility management (PMM) function, with an MSC still performing HLR interrogation and/or CAMEL queries.

CAMEL-based services are supported because the landline switching network performs PMM; the full mobility management functions of HLR interrogation and CAMEL signaling messaging are still performed by the V-MSC within the mobile network. Moreover, the disclosed architecture can be selectively applied on a geographic basis, and thus, can be deployed where there is existing IT (information technology) billing support. Further, the disclosed architecture provides for determination of a V-MSC E-164 address in a manner which neither involves the V-MSC nor utilizes scarce V-MSC resources.

As required, detailed embodiments of the innovation are disclosed herein. It should be understood that the disclosed embodiments are merely exemplary of the innovation that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the innovation. Therefore, specific structural and functional details disclosed herein are not to be interpreted as limiting, but merely as a basis for the claims and as a representative basis for teaching one skilled in the art to variously employ the innovation.

Figure 1:
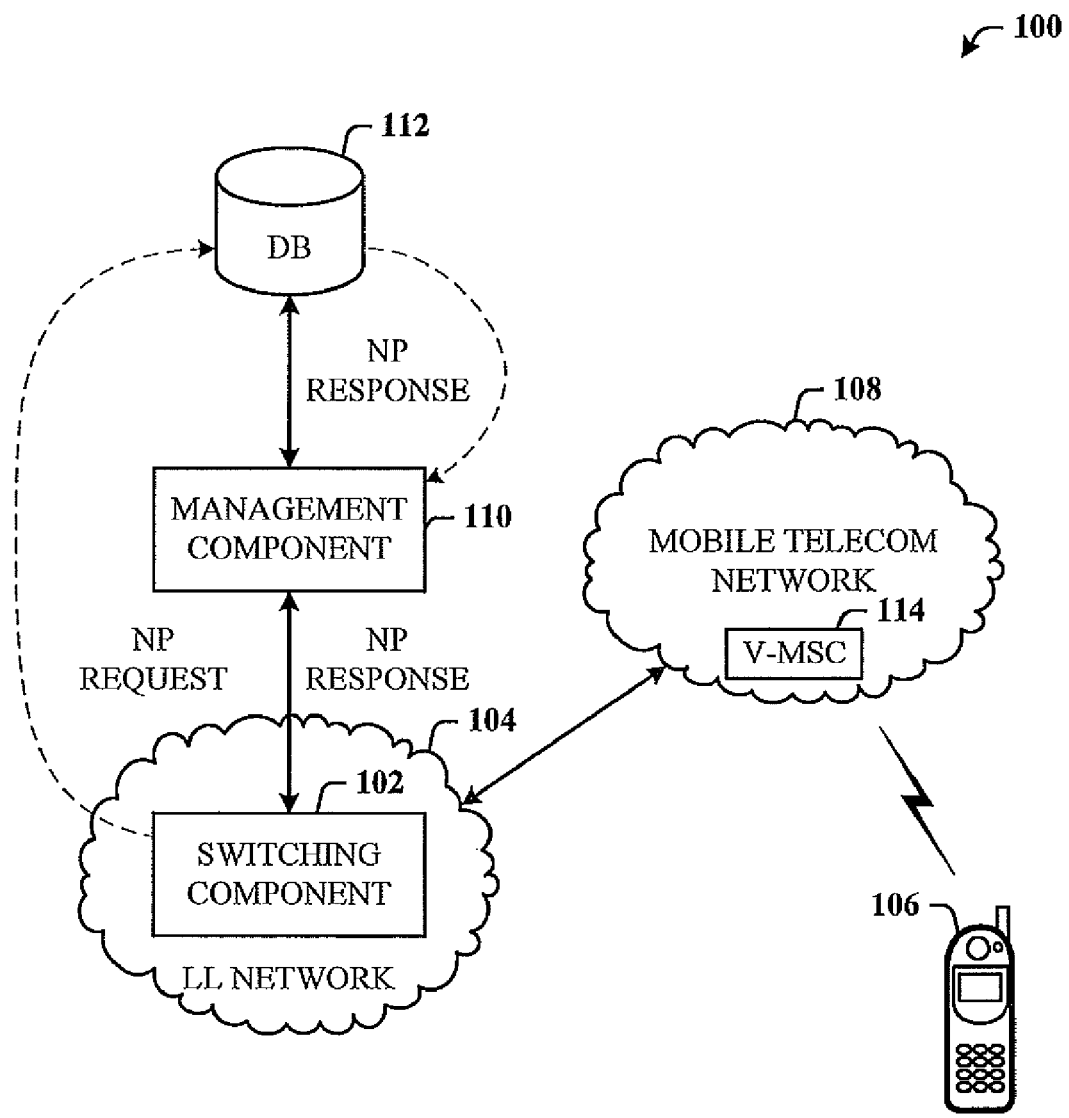
FIG. 1 illustrates a system that facilitates preliminary mobility management (PMM) for call communications in accordance with the innovation.

Referring initially to the drawings, FIG. 1 illustrates a system 100 that facilitates call communications in accordance with the innovation. The system 100 includes a switching component 102 of a landline telecommunications (telecom) network 104 for generating a number portability (NP) request (e.g., LNP) based on a landline call to a mobile terminated device 106 (e.g., cell phone) on a mobile telecom network 108. In one implementation, a management component 110 intercepts the NP request (or query) from the switching component 102, queries a database (DB) 112 (e.g., an LNP database) of NP information using the request, and performs preliminary mobility management (PMM) on the NP response from the database 112 to return an LRN destination information for routing the call to the mobile terminated device 106. PMM operates to determine the LRN, for example, for a current V-MSC 114 of the mobile network 108 to which the mobile terminated device 106 is attached. The LRN for the V-MSC 114 is then returned in the NP response from the management component 110 to the switching component 102. The call is then routed to the V-MSC 114 of the mobile network 108 based on the LRN for call completion to the device 106. The V-MSC 114 then performs HLR interrogation and/or CAMEL queries associated with full mobility management.

In an alternative implementation (as indicated by the dashed lines), the NP request can be issued directly to the database 112 from the switching component 102 thereby bypassing the management component 110. However, the NP response from the database 112 is then captured by the management component 110 and processes the NP response to include the destination information (e.g., LRN) of the servicing V-MSC 114 to complete the call to the mobile device 106.

Given that the number of NP queries and/or responses to be processed can be large, the database system 112 employed to maintain LNP data should be sufficiently fast (e.g., in transactions per second) at least related to query and response processing to minimize the delay in connecting the call. For example, in one implementation, the database system 112 can be an SS7 (Signaling System 7) entity called a service control point (SCP). In an alternative implementation, the database system 112 can be an integrated signal transfer point (STP), which can be faster than SCPs.

This is just one example of PMM between landline and mobile telecom systems. Other implementations will be described in detail infra, for example, related to landline and a GSM (global system for mobile communications) and MAP (mobile application part) mobile subscribers, landline and an IS-41 mobile subscriber (IS-41 is an ANSI standard that allows switches to exchange subscriber information related to call routing on mobile networks, how users are identified and authenticated, and how calls are routed during roaming), and mobile-to-mobile communications, for example.

Note that although illustrated as separate from the landline network 104, the management component 110 (for PMM functionality) can be located as part of the landline network 110, included as part of the landline switching component 102, sited in the telecom network 108, and/or included as part of the V-MSC 114, for example.

While the NP request issued by the switching component 102 is being processed, the switching component 102 can be processing a timeout such that if the anticipated response is not received within the timeout period, the call can be dropped. Alternatively, if the response is not returned within the prescribed timeout period, the switching component 102 can go ahead with processing the call as if the management component 110 did not exist. Thus, the caller will not experience a dropped call.

Figure 2:
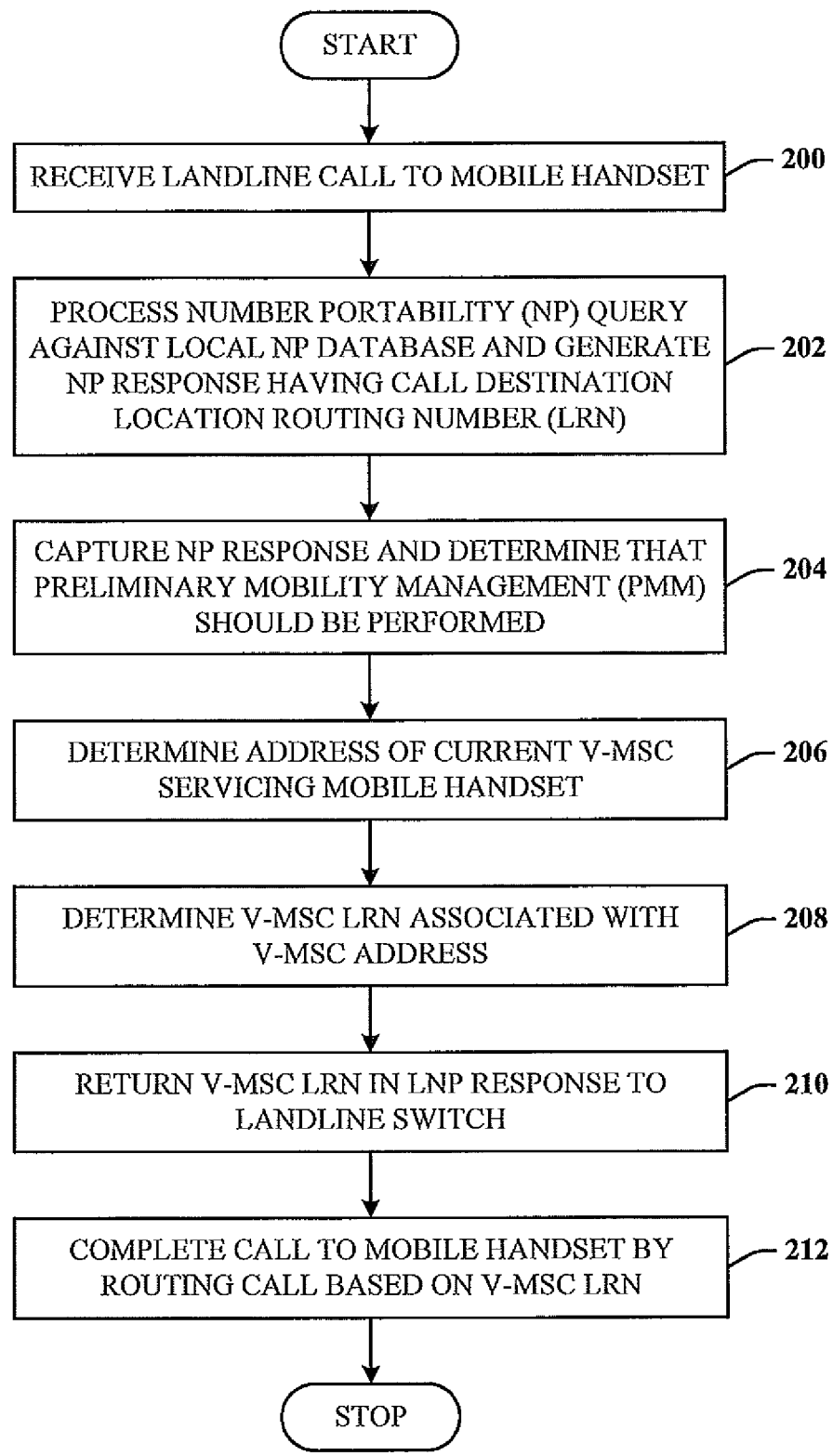
FIG. 2 illustrates a methodology of managing call communications in accordance with the innovation.

FIG. 2 illustrates a methodology of managing call communications in accordance with the innovation. While, for purposes of simplicity of explanation, the one or more methodologies shown herein, for example, in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, a landline call to a mobile handset is received at a landline switch. The switch then issues an NP query to an LNP database. As described above, the query can be issued directly to the database or captured for processing through the management component. In either case, an NP response is generated. Accordingly, at 202, the NP query is processed against the LNP database and an NP response is generated that includes a call destination LRN. At 204, the NP response is captured (e.g., by the management component) and processed to determine that PMM should be performed. Note that other processes can occur, as described herein, when it is determined that PMM is not performed. At 206, the address for current V-MSC servicing the mobile handset is determined. At 208, the V-MSC LRN associated with the V-MSC address is determined according to in one instance, a lookup table. At 210, the V-MSC LRN is returned in the LNP response to the landline switch. At 212, the call is completed to the mobile handset by routing the call based on the V-MSC LRN.

Figure 3:
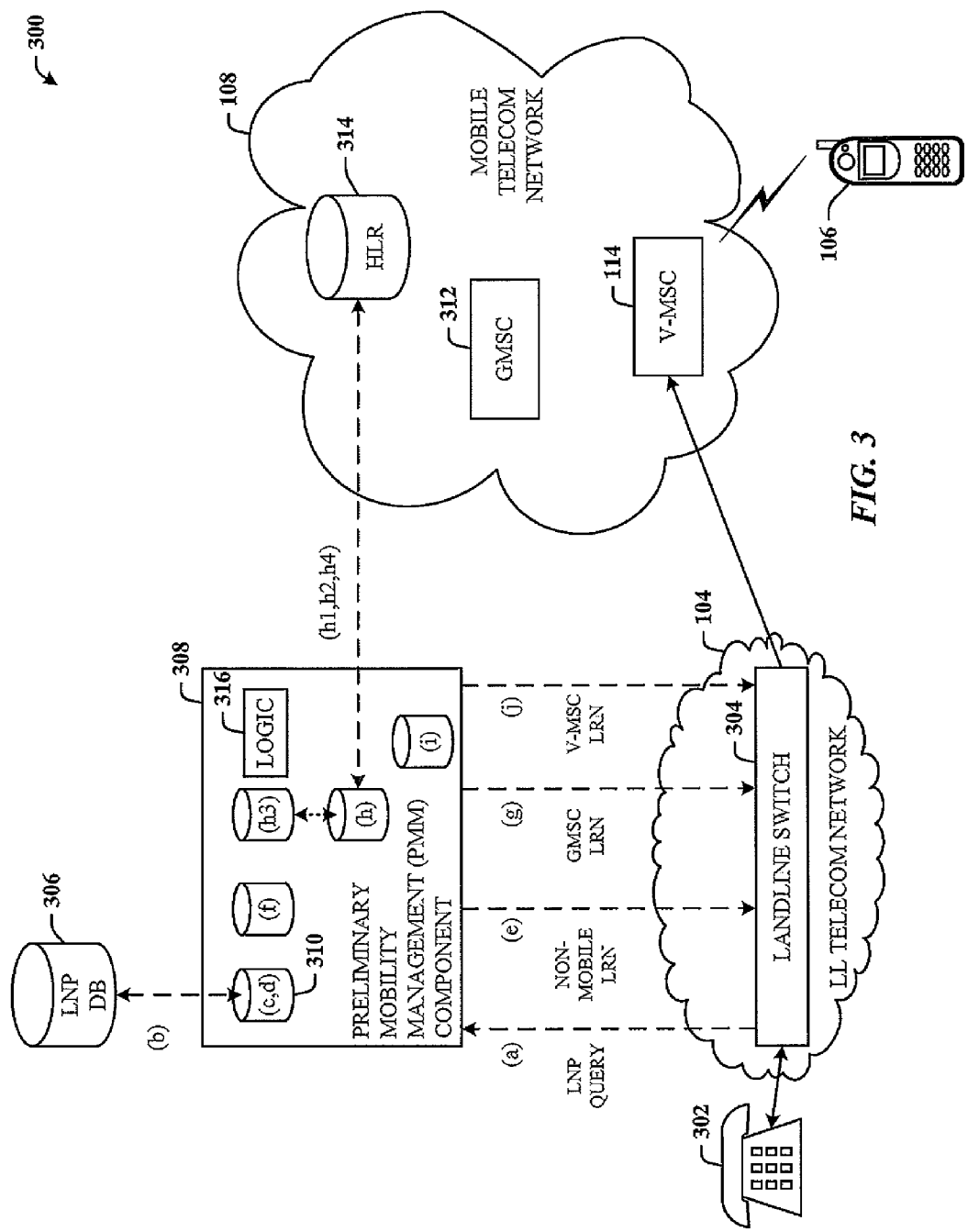
FIG. 3 illustrates a detailed diagram of a system that facilitates PMM for call processing associated with a landline to GSM-based mobile communications in accordance with the disclosed architecture.

FIG. 3 illustrates a detailed diagram of a system 300 that facilitates PMM for call processing associated with a landline to GSM-based mobile communications in accordance with the disclosed architecture. The system 300 utilizes LNP analysis to perform PMM in order for a landline-originated call destined for a GSM-MAP-based mobile subscriber to be routed (e.g., directly) to the V-MSC 114 to which the mobile subscriber is currently attached. The V-MSC 114 then performs the traditional GMSC (gateway mobile switching center) functions such as HLR interrogation and CAMEL service-related signaling queries. This avoids the need for stand-alone GMSC switches as well as the need for dedicated trunk groups from the landline switching network to stand-alone GMSCs.

In one implementation, the call management process can occur as follows. At (a), in response to processing a call from a handset 302 to the mobile device 106, a switch 304 (e.g., as part of the switching component 102 of FIG. 1) of the landline network 104 issues an NP request (or query) to an LNP database system 306. The LNP request can be intercepted by a PMM component 308 (e.g., as part of the management component 110 of FIG. 1), and transmitted to a traditional LNP database system 306 in order to receive the LRN, or if not ported out, the destination telephone number. However, this is not a requirement, since, as described above, the NP query could also be routed directly (e.g., around or passed through the PMM component 308) to the database 306 thereby bypassing the PMM component 308. At (b), the database system 306 processes the received query to find the LRN for the destination device, and generate a response that includes the LRN. Alternatively, if the call is not ported, the database system 306 returns in the response the destination telephone number. At (c), the PMM 308 intercepts the response from the database system 306, and queries a local PMM translations table 310 to determine if the LRN (or if not ported, the destination telephone number) belongs to the subscriber's mobile telecom network 108 carrier. Optionally, at (d), the PMM 308 replaces the non-ported mobile number with the LRN of a GMSC 312 of the telecom network 108 based upon the lookup table 310. Call processing is then based on the GMSC 312.

In other words, at (e), if the destination number does not belong to the mobile telecom network 108, the response, as intercepted by the PMM 308, is returned from the LNP database system 306 unchanged to the landline switch 304. At (f), if the destination number belongs to the mobile telecom network 108, it is determined via the lookup table 310 whether PMM is performed for this call (e.g., based upon the originating switch point code and destination LRN or NPA-NXX-X (number plan area-exchange, or area code plus exchange) of the mobile number). Number Portability Administration Centers (NPACs) manage requests from carriers for the porting of telephone numbers. NPA-NXX indicates that any North American call can be based on the first seven digits (the area code and the office code). At (g), if PMM is not to be performed, the GMSC LRN or non-ported mobile number is returned in the LNP response from the PMM component 308 to the landline switch 304.

At (h), if PMM is to be performed, the current V-MSC address (e.g., E-164) for the V-MSC associated with that mobile subscriber can be determined via one of the following mechanisms. At (h1), PMM is initiated by sending an HLR interrogation signaling message (e.g., GSM-MAP-ANY-TIME-INTERROGATION) from the PMM component 308 to an HLR 314 of the telecom network 108. Alternatively, at (h2), a routing information request signaling message (e.g., GSM-MAP-SEND-ROUTING-INFO-FOR-SM) is sent from the PMM component 308 to the HLR 314. Still alternatively, at (h3), a lookup operation can be performed against a database (e.g., dynamic) of the PMM component 308 that views either the realtime signaling messages made to the HLRs or a copy of the realtime signaling messages made to the HLRs, and records the latest V-MSC address based upon a registration message (e.g., GSM-MAP-UPDATE-LOCA-TION). Alternatively, at (h4), a routing information signaling message (e.g., GSM-MAP-SEND-ROUTING-INFO-FOR-LOCATION-SERVICES, which can also be referred to as GSM-MAP-SEND-ROUTING-INFO-FOR-LCS) is sent from the PMM component 308 to the HLR 314.

At (i), the PMM component 308 translates the V-MSC address (e.g., E-164) to the V-MSC LRN based upon a lookup table. At (j), the PMM component 308 returns the V-MSC LRN in the LNP response to LNP request (or query) of the landline switch 304. The call is then routed according to the V-MSC LRN. In support thereof, the V-MSC 114 can be pre-configured to serve as a temporary GMSC in order to handle the particular call. Note that the V-MSC 114 is, typically, already configured in GSM networks to serve as a GMSC for calls routed to the V-MSC LRN.

Accordingly, it can be appreciated that the disclosed architecture allows for the utilization of the landline switching network 104 to serve effectively as the "GMSC/tandem" switching layer for the mobile network. The disclosed mechanisms are more efficient. Conventional systems could intercept an LNP query, utilize the GSM-MAP-SEND-ROUTING-INFO message to determine a mobile subscriber routing number (MSRN), and then subsequently route directly to the MSRN. But in such a system, CAMEL-based services cannot be supported. Further, a conventional system could utilize the MAP-SEND-ROUTING-INFO message to retrieve an MSRN, and then translate that MSRN into a V-MSC address via a look up table. But by using this message, the MSRN on the V-MSC would be utilized even if the only purpose of the GSM-MAP-SEND-ROUTING-INFO message is to determine the V-MSC address.

The system 300 can also include logic 316 for determining whether the V-MSC address should be included in the LNP response. The logic 316 can be configured to include the originating switch identity, destination switch identity, the percentage of calls to which this should be applied, or any combination of the above. This logic 316 can be a separate entity from or included as part of the PMM component 308, for example. For example, if it is determined that the originating switch and the destination switch are of the same location (e.g., geographic), this information can be employed by the logic 316 to determine whether to apply PMM.

Implementation of the disclosed architecture into legacy networks can be a concern for customers, given the costs associated with providing trunk groups, etc. One implementation provides a "hard" on/off scenario where the customer provides the complete infrastructure in preparation for accommodating the PMM components. An alternative implementation facilitates a gradual migration of call traffic for the available (or affordable) hardware/software infrastructure rather than employing the more restrictive on/off methodology. For example, the logic 316 is suitably robust to facilitate the gradual implementation by manually configuring predetermined parameters (e.g., a percentage of calls) for the existing call traffic load. The user can configure parameters on which the determination of employing PMM will be based. In other words, based on when the parameters (e.g., number of calls) are met or exceeded, PMM can be applied.

In yet another implementation, the logic 316 can include intelligence that learns and reasons about system operations and load, for example, based on the parameters currently employed. The intelligent logic 316 then automatically makes decisions about changing or modifying one or more of those parameters to handle the current operating conditions (e.g., call traffic). For example, in peak load conditions, the logic can change the operating parameters to address the increased load (e.g., due to a failed trunk group), while at reduced load situations the parameters can be changed back (e.g., based on a newly-installed trunk group). The logic 316 can be located in the switch (e.g., landline or mobile originating) and/or in the mobile network, as well.

In an alternative implementation described above, an SRI for LCS (Send Routing Info for Location Services) message can be employed to retrieve the V-MSC address. This method can be superior in that it does not trigger a subsequent query by the HLR such as an HLR query to the V-MSC, for example, and thus, places a lower signaling traffic load on the network. In this case, some HLRs may require the requestor to be identified to the HLR as a GMLC (Gateway Mobile Location Center), to be able to perform this query.

In yet another alternative implementation, an ATI (any time interrogation) query into the HLR triggers the HLR to send a PSI (provide subscriber info) message to the serving MSC which sends either a page or a location report control request toward the mobile device depending on the state the mobile device is in (e.g., idle, call setup in progress, in conversation state). Thus, this can query additional SS7 traffic and A/Iu CS traffic. If the ATI is used, the age of the information can also be taken into consideration, since there can be instances where stale location information could be returned.

In either of the cases for ATI or SRI for LCS, if the mobile device is inactive long enough, a VLR (visitor location register) may perform a purge of the VLR information, which can trigger a request to the HLR to remove the location information. In this case, there will not be visited MSC information. The default result of the LNP query can then be returned in this case.

Figure 4:
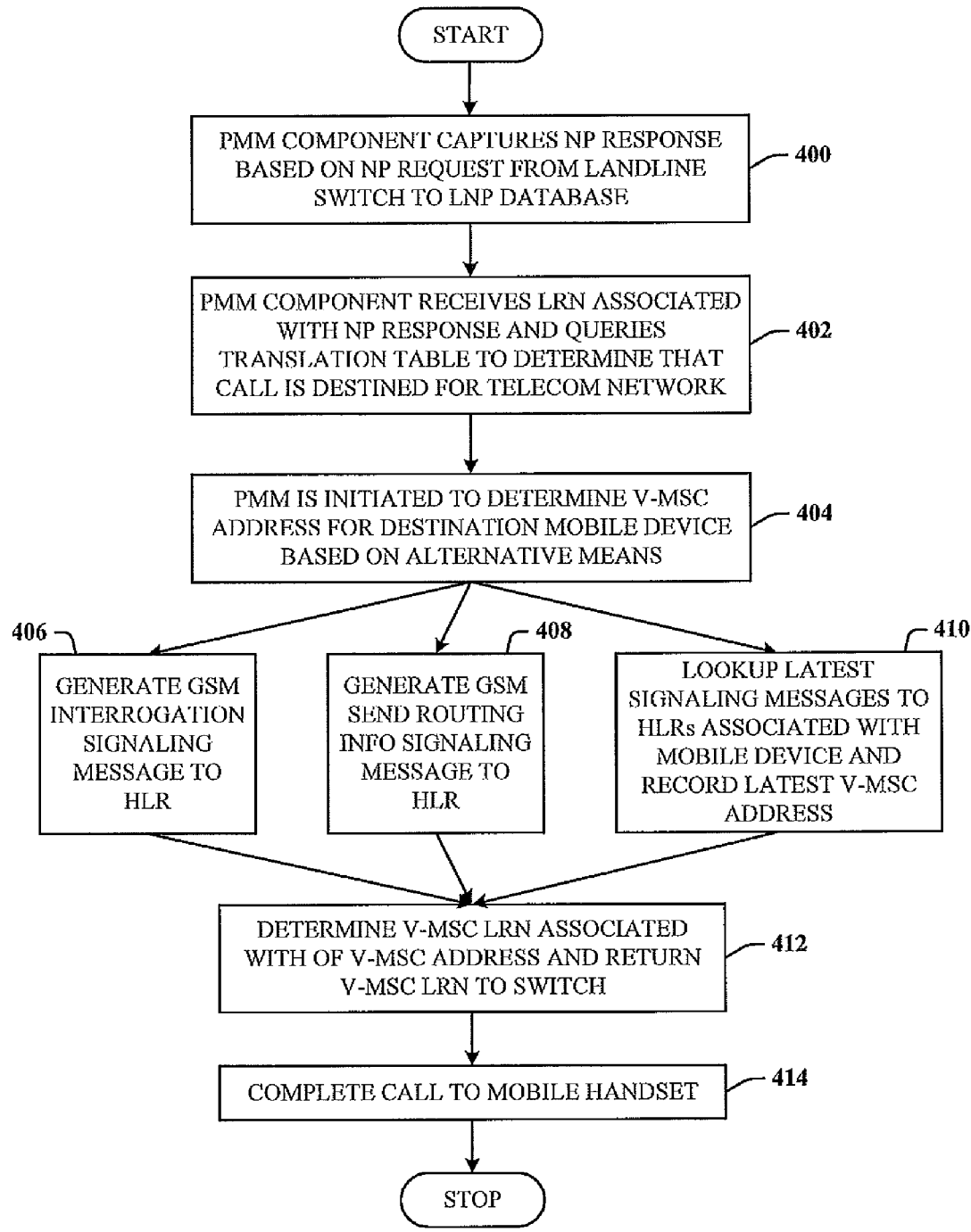
FIG. 4 illustrates a method of processing a call using PMM associated with landline to GSM-based mobile communications in accordance with the disclosed architecture.

FIG. 4 illustrates a method of processing a call using PMM associated with landline to GSM-based mobile communications in accordance with the disclosed architecture. At 400, the PMM component captures an NP response from an LNP database based on an NP request generated from a landline switch to the LNP database. At 402, the PMM component receives an LRN associated with the NP response and queries a translation table (e.g., of the PMM component) to determine that the call is destined for mobile device of a mobile telecom network. At 404, PMM is initiated to determine a V-MSC address for the mobile device based on one of the following alternative means. At 406, a GSM interrogation signaling message (e.g., GSM-MAP-ANY-TIME-INTERROGATION) is generated and sent by the PMM component to an HLR of the mobile telecom network. Alternately, at 408, a GSM send routing information signaling message (e.g., GSM-MAP-SEND-ROUTING-INFO-FOR-SM or GSM-MAP-SEND-ROUTING-INFO-FOR-LCS) is generated and sent by the PMM component to an HLR of the mobile telecom network.

Still alternately, at 410, HLR interrogation is performed by looking up the latest signaling messages to the HLR that are associated with the mobile device. The latest address of the V-MSC associated with the mobile device is then recorded based upon an update message (e.g., a GSM-MAP-UPDATE-LOCATION registration message). At 412, based on one of the forgoing means, the PMM component obtains the V-MSC LRN associated with the V-MSC address and returns the V-MSC LRN to the switch. At 414, the switch then completes the call connection by routing the call to the appropriate servicing V-MSC of the mobile device.

Referring again to FIG. 3, the system 300 can also accommodate PMM for call processing associated with a landline to an IS-41-based mobile subscriber. The system 300 utilizes LNP analysis to perform PMM in order for a landline-originated call destined for an IS-41-based mobile subscriber (e.g., device 106) to be routed directly to the V-MSC 114 to which the mobile subscriber is currently attached. The V-MSC 114 then performs the traditional GMSC functions such as HLR interrogation and intelligent network (IN) service-related signaling queries.

In one exemplary implementation of this call processing scenario, the same steps (a)-(g) outlined above with respect to FIG. 3, apply here. However, at (h), if PMM is performed, a current SS7 point code of the V-MSC 114 serving the mobile subscriber 106 can be determined by one of the following ways. At (h2), preliminary mobility management is initiated by the PMM component 308 by generating and sending an IS-41-MAP-SMSRequest signaling message to the HLR 314. The routing information request previously provided at (h1) and (h4) are not performed in this scenario. Alternatively, at (h3), a lookup operation is performed against a database (e.g., dynamic) of the PMM component 308 that views either the realtime signaling messages made to the HLRs or a copy of the realtime signaling messages made to the HLRs, and records the latest V-MSC point code based upon the IS-41-MAP-RegistrationNotification message. At (i), the PMM component 308 the V-MSC LRN associated with the V-MSC point code is obtained based upon a lookup table. At (j), the V-MSC LRN is returned to the landline switch 304 in the LNP response. The call is then routed to the destination according to the V-MSC LRN.

Figure 5:
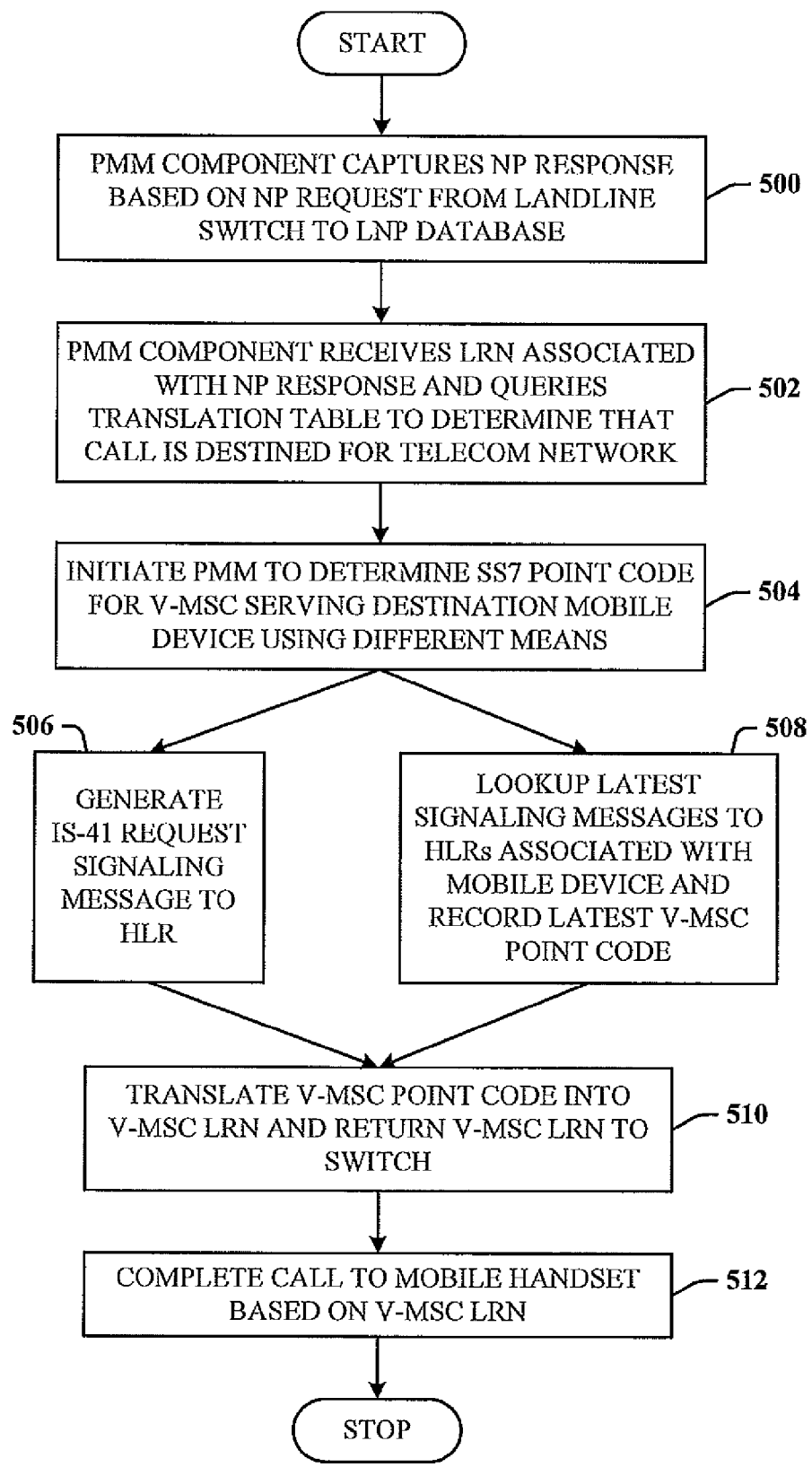
FIG. 5 illustrates a method of processing a call using PMM associated with landline-to-IS-41-based mobile communications in accordance with the disclosed architecture.

FIG. 5 illustrates a method of processing a call using PMM associated with landline-to-IS-41-based mobile communications in accordance with the disclosed architecture. At 500, the PMM component captures an NP response from an LNP database based on an NP request generated from a landline switch to the LNP database. At 502, the PMM component receives an LRN associated with the NP response and queries a translation table (e.g., of the PMM component) to determine that the call is destined for a mobile device of a mobile telecom network. At 504, PMM is initiated to determine an SS7 point code for the V-MSC servicing the mobile device using one of the following means. According to a first means, at 506, an IS-41 request signaling message (e.g., IS-41-MAP-SMSRequest) is generated and sent by the PMM component to an HLR of the mobile telecom network. Alternatively, at 508, HLR interrogation is performed by looking up the latest signaling messages to the HLR that are associated with the mobile device. The latest point code of the V-MSC associated with the mobile device is then recorded based upon a registration message (e.g., IS-41-MAP-RegistrationNotification). Based on either means, at 510, the PMM component translates the V-MSC point code into the V-MSC LRN and returns the V-MSC LRN to the switch. At 512, the switch then completes the call connection by routing the call to the appropriate V-MSC servicing the mobile device based on the V-MSC LRN.

Figure 6:
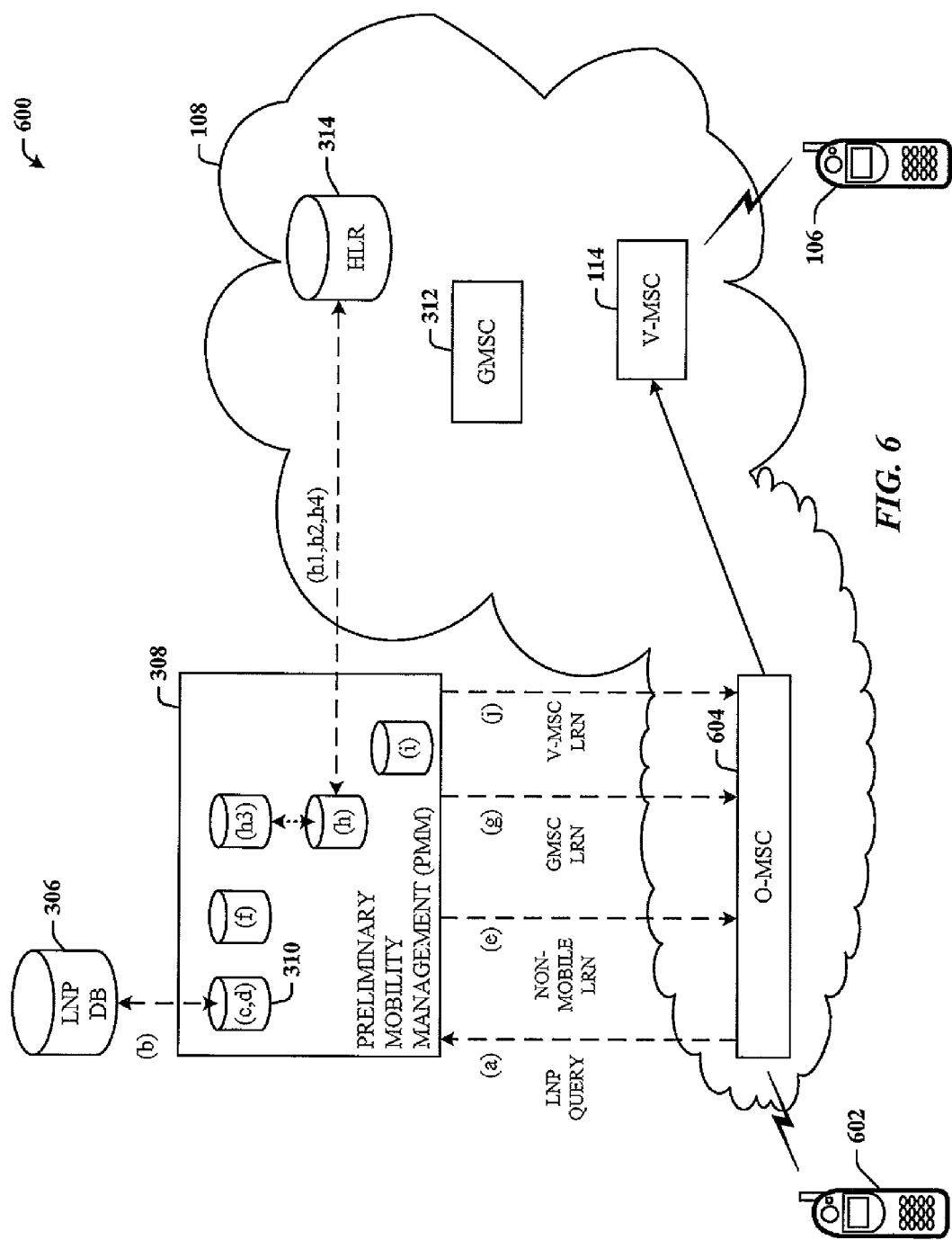
FIG. 6 illustrates a system that facilitates mobile-to-mobile communications using PMM functionality in accordance with the subject architecture.

FIG. 6 illustrates a system 600 that facilitates mobile-to-mobile communications using PMM functionality in accordance with the subject architecture. The system 600 utilizes PMM LNP analysis in order for a mobile-originated call of an originating device 602 destined for the GSM-MAP-based mobile subscriber 106 to be routed directly to the V-MSC 114 to which the mobile subscriber 106 is currently attached. The V-MSC 114 then performs the traditional GMSC functions such as HLR interrogation and/or CAMEL service-related signaling queries. This avoids the need for stand-alone GMSC switches as well as the need for dedicated trunk groups from the landline switching network to stand-alone GMSCs.

In one implementation for mobile-to-mobile call processing, the call management process can be performed in a mobile-to-GSM scenario, as follows. At (a), in response to processing a call from the mobile device 602 to the mobile device 106, an originating MSC (O-MSC) 604 of the mobile network 108 issues an NP request (or query) to the LNP database 306. The LNP request can be intercepted by the PMM component 308 (e.g., as part of the management component 110 of FIG. 1), and transmitted to a traditional LNP database system 306 in order to receive the LRN, or if not ported out, the destination telephone number. However, this is not a requirement, since, as described above, the NP query could also be routed directly (e.g., around the PMM component 308) to the database 306 thereby bypassing the PMM component 308. At (b), the database system 306 processes the received NP query to find the associated LRN for the destination device, and generate a response that includes the LRN. Alternatively, if the call is not ported, the database system 306 finds and returns in the response the destination telephone number. At (c), the PMM 308 intercepts the response from the database system 306, and queries the translations table 310 (e.g., local to the PMM component 308) to determine if the LRN (or if not ported, the destination telephone number) belongs to the mobile telecom network 108. Optionally, at (d), the PMM component 308 replaces the non-ported mobile number with the LRN of the GMSC 312 of the telecom network 108 based upon the lookup table 310. Call processing is then according to the GMSC.

In other words, at (e), if the destination device 106 does not belong to the mobile telecom network 108, the response is returned unchanged from the LNP database system 306 to the O-MSC 604. At (f), if the destination number belongs to the mobile telecom network 108, it is determined via the lookup table 310 whether PMM is performed for this call (based upon the originating switch point code and destination LRN or NPA-NXX of the mobile number). At (g), if PMM is not to be performed, the GMSC LRN or non-ported mobile number is returned as the LNP response to the O-MSC 604.

At (h), if PMM is to be performed, the current V-MSC address (e.g., E-164) for the V-MSC associated with that mobile subscriber can be determined via one of the following mechanisms. At (h1), PMM can be initiated by sending an HLR interrogation signaling message (e.g., GSM-MAP-ANY-TIME-INTERROGATION) from the PMM component 308 to the HLR 314 of the telecom network 108. Alternatively, at (h2), a routing information request signaling message (e.g., GSM-MAP-SEND-ROUTING-INFO-FOR-SM) can be sent from the PMM component 308 to the HLR 314. Still alternatively, at (h3), a lookup operation can be performed against a database (e.g., dynamic) of the PMM component 308 that views either the realtime signaling messages made to the HLRs or a copy of the realtime signaling messages made to the HLRs, and records the latest V-MSC address based upon a registration message (e.g., GSM-MAP-UPDATE-LOCATION). Alternatively, at (h4), a routing information signaling message (e.g. GSM-MAP-SEND-ROUTING-INFO-FOR-LOCATION-SERVICES, which can also be referred to as GSM-MAP-SEND-ROUTING-INFO-FOR-LCS) is sent from the PMM component 308 to the HLR 314.

At (i), the PMM component 308 translates the V-MSC address (e.g., E-164) to obtain the V-MSC LRN based upon a lookup table. At (j), the PMM component 308 returns the V-MSC LRN in the LNP response to the originating switch 604. In support thereof, the V-MSC 114 can be pre-configured to serve as a temporary GMSC in order to handle the particular call. Note that the V-MSC 114 is, typically, already configured in GSM networks to serve as a GMSC for calls routed to the V-MSC LRN.

Figure 7:
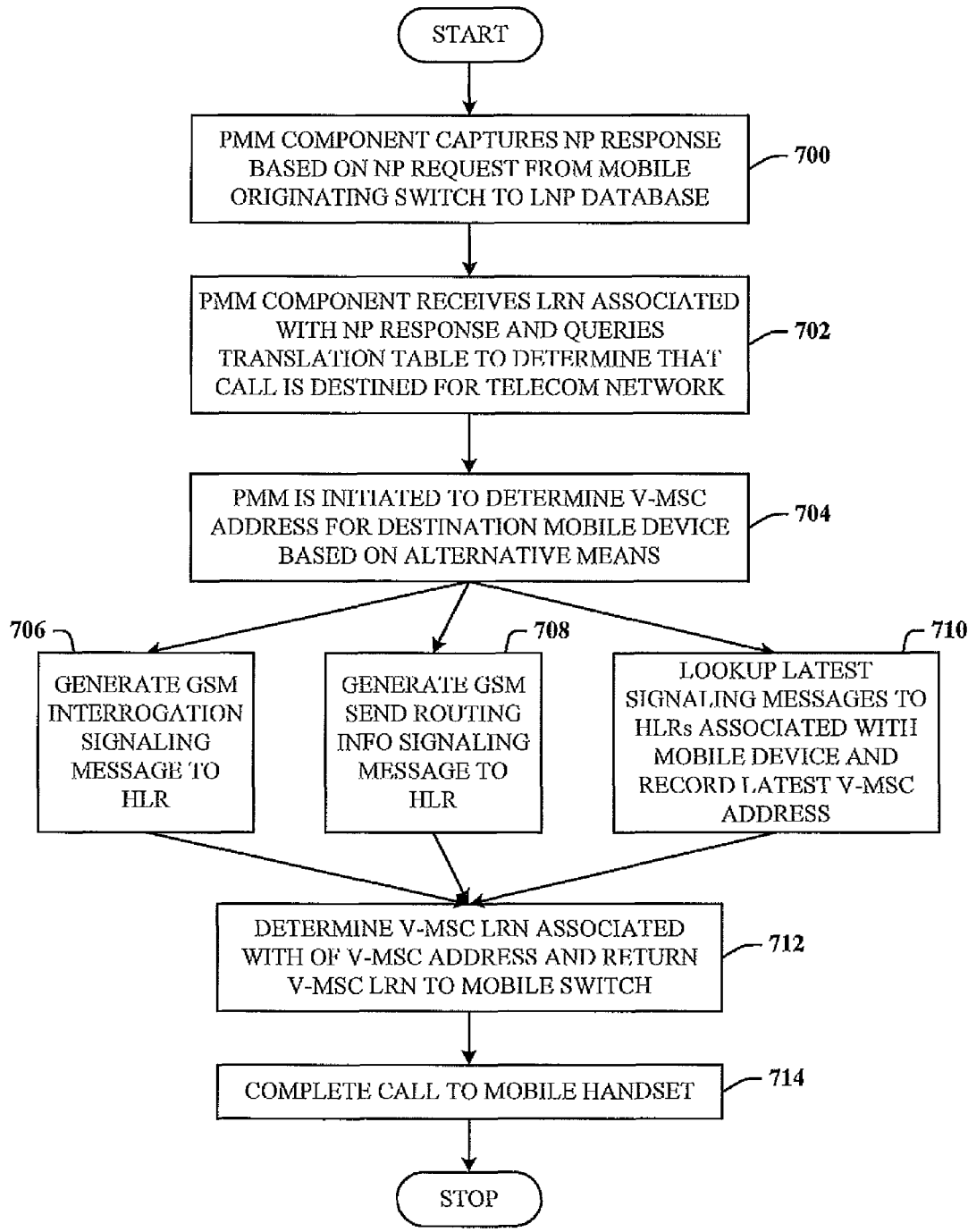
FIG. 7 illustrates a method of processing a call using PMM associated with mobile-to-GSM communications in accordance with the disclosed architecture.

FIG. 7 illustrates a method of processing a call using PMM associated with mobile-to-GSM communications in accordance with the disclosed architecture. At 700, the PMM component captures an NP response from an LNP database, based on an NP request generated from a mobile originating switch (e.g., O-MSC). At 702, the PMM component receives an LRN associated with the NP response and queries a translation table (e.g., of the PMM component) to determine that the call is destined for a mobile device of a telecom network. At 704, PMM is initiated to determine a V-MSC address for the mobile device based on one of the following mechanisms. At 706, a GSM interrogation signaling message (e.g., GSM-MAP-ANY-TIME-INTERROGATION) is generated and sent by the PMM component to an HLR of the telecom network. Alternatively, at 708, a GSM send routing information signaling message (e.g., GSM-MAP-SEND-ROUTING-INFO-FOR-SM or GSM-MAP-SEND-ROUTING-INFO-FOR-LCS) is generated and sent by the PMM component to an HLR of the telecom network.

Still alternatively, at 710, HLR interrogation can be performed by looking up the latest signaling messages to the HLR that are associated with the mobile device. The latest address of the V-MSC associated with the mobile device is then recorded based upon an update message (e.g., a GSM-MAP-UPDATE-LOCATION registration message). At 712, based on one of the forgoing mechanisms, the PMM component obtains the V-MSC LRN associated with the V-MSC address and returns the V-MSC LRN to the mobile originating switch. At 714, the originating switch then completes the call connection by routing the call to the appropriate V-MSC servicing the mobile device.

The system 600 of FIG. 6 also accommodates PMM for call processing associated with mobile-to-IS-41-based mobile subscribers. The system 600 utilizes LNP analysis to perform PMM in order for a mobile-originated call (device 602) destined for an IS-41-based mobile subscriber (e.g., device 106) to be routed directly to the V-MSC 114 to which the mobile subscriber is currently attached. The V-MSC 114 then performs the traditional GMSC functions such as HLR interrogation and intelligent network (IN) service-related signaling queries.

In one exemplary implementation of the mobile-to-IS-41 call processing scenario, the same steps (a)-(g) outlined above with respect to FIG. 6, apply here. However, at (h), if PMM is performed, the current SS7 point code of the V-MSC 114 serving the mobile subscriber 106 can be determined using one of the following ways. At (h2), preliminary mobility management is initiated by the PMM component 308 by generating and sending an IS-41-MAP-SMSRequest signaling message to the HLR 314. The routing information requests previously provided at (h1) and (h4) are not performed in this scenario. Alternatively, at (h3), a lookup operation can be performed against a database (e.g., dynamic) of the PMM component 308 that views either the realtime signaling messages made to the HLRs or a copy of the realtime signaling messages made to the HLRs, and records the latest V-MSC point code based upon the IS-41-MAP-RegistrationNotification message. At (i), the PMM component 308 obtains the V-MSC LRN associated with the V-MSC point code based upon a lookup table. At (j), the V-MSC LRN is returned to the originating switch 604 in the LNP response.

Figure 8:
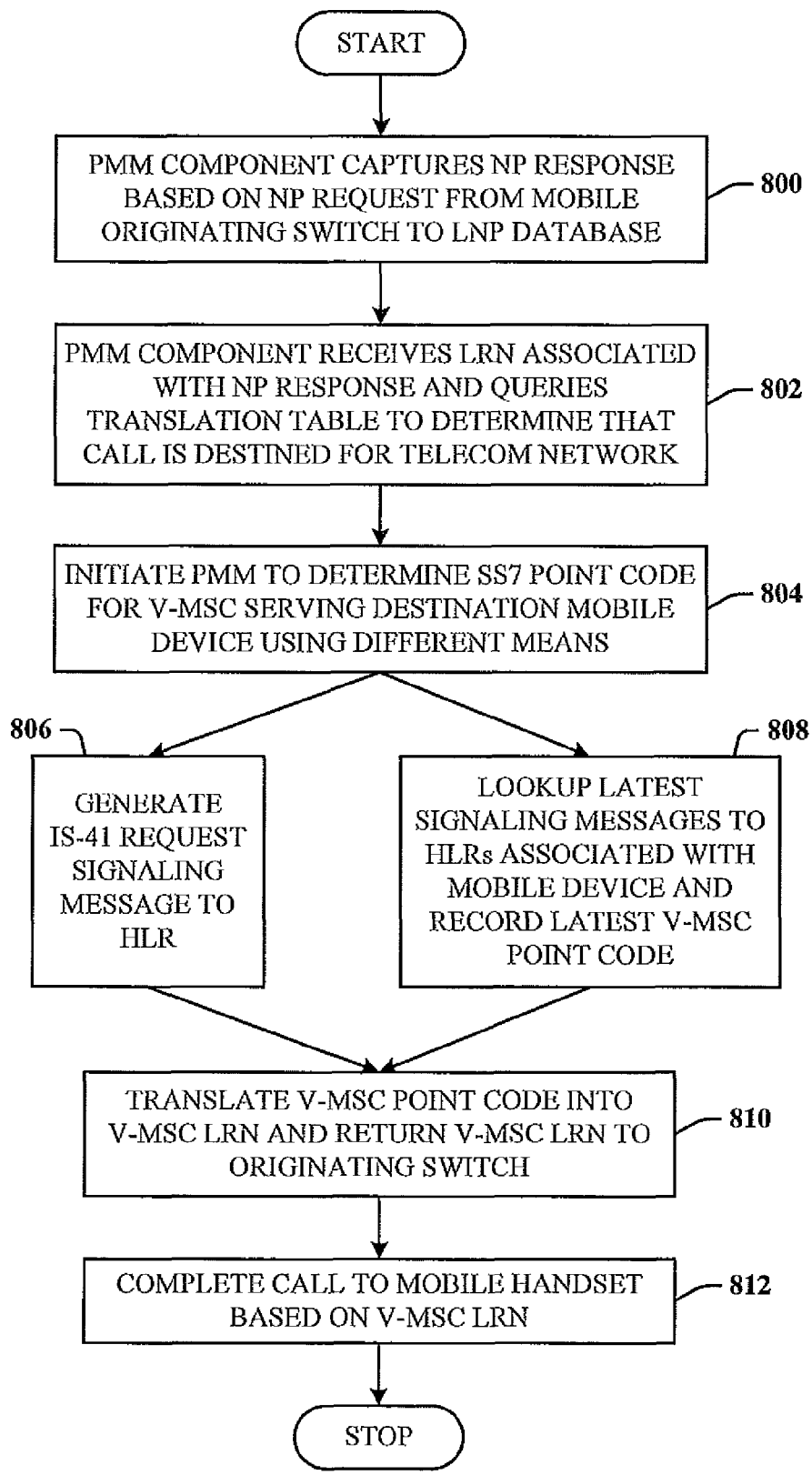
FIG. 8 illustrates a method of processing a call using PMM associated with mobile-to-IS-41 communications in accordance with the disclosed architecture.

FIG. 8 illustrates a method of processing a call using PMM associated with mobile-to-IS-41 communications in accordance with the disclosed architecture. At 800, the PMM component captures an NP response from an LNP database based on an NP request from a mobile originating switch (e.g., O-MSC) to the LNP database. At 802, the PMM component receives an LRN associated with the NP response and queries a translation table to determine that the call is destined for a mobile device of a mobile telecom network. At 804, PMM is initiated to determine an SS7 point code for the V-MSC servicing the mobile device using one of the following mechanisms. At 806, an IS-41 request signaling message (e.g., IS-41-MAP-SMSRequest) is generated and sent by the PMM component to an HLR of the mobile telecom network. Alternatively, at 808, HLR interrogation is performed by looking up the latest signaling messages to the HLR that are associated with the mobile device. The latest point code of the V-MSC associated with the mobile device is then recorded based upon a registration message (e.g., IS-41-MAP-RegistrationNotification). Based on either mechanism, at 810, the PMM component facilitates translation of the V-MSC point code into the V-MSC LRN, and returns the V-MSC LRN to the originating switch (e.g., O-MSC). At 812, the originating switch then completes the mobile-to-mobile call connection by routing the call to the appropriate V-MSC servicing the destination mobile device based on the V-MSC LRN.

Figure 9:
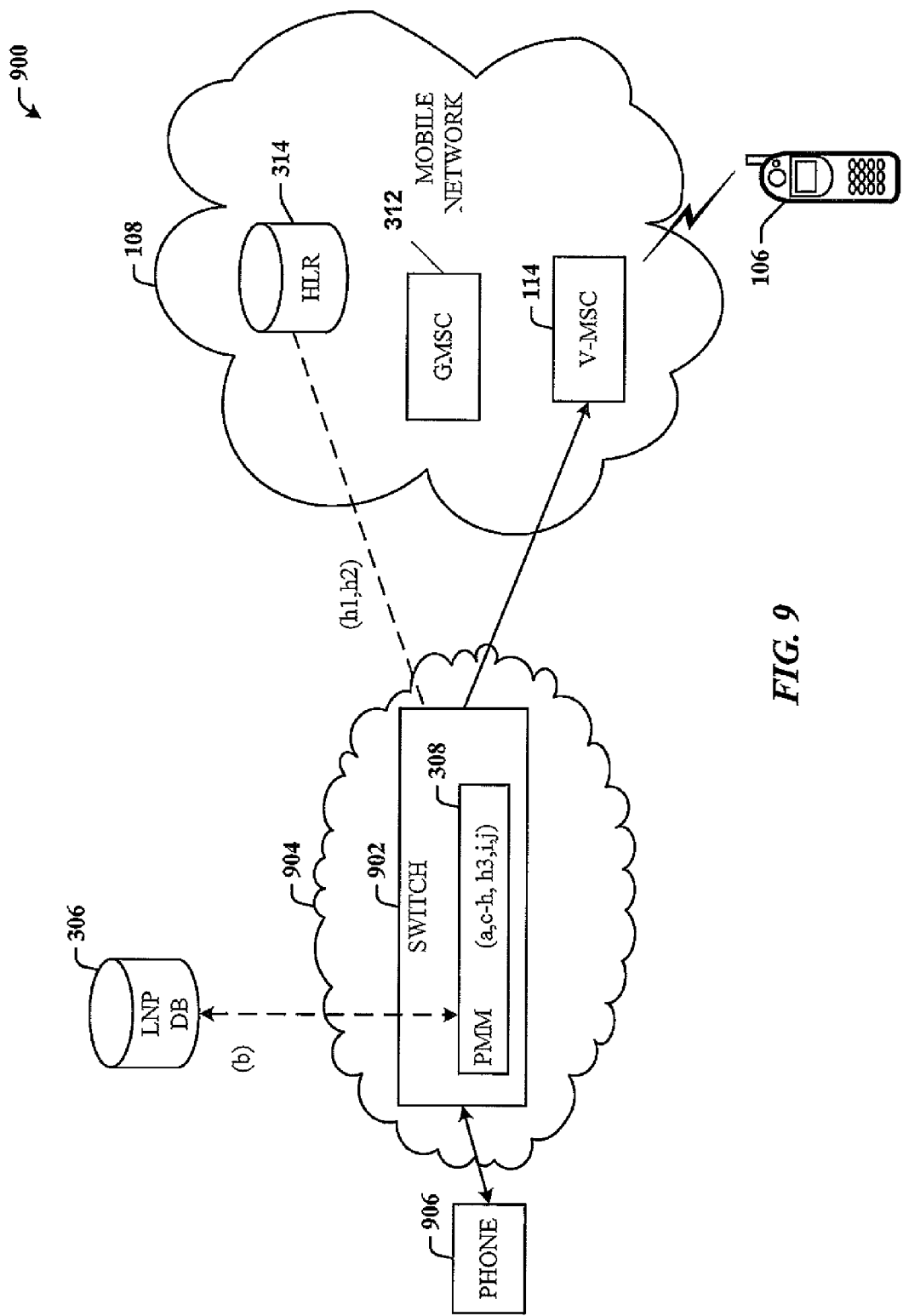
FIG. 9 illustrates an alternative system that facilitates LNP PMM functionality in a switch.

FIG. 9 illustrates an alternative system 900 that facilitates LNP PMM functionality in a switch 902 (e.g., landline or O-MSC). Here, the PMM component 308 is included in the switch 902, which switch 902 can be a landline switch where a network 904 in which it is utilized is a landline telecom network. Alternatively, the switch 902 can be an O-MSC, for example, where the network 904 is part of the mobile network 108. The switch 902 processes calls between a phone 906 (e.g., a landline phone when the network is landline-based, or a mobile phone when the network 904 is a mobile network). The PMM component 308 captures an LNP response from the LNP database 306 based on a request initiated from the switch 902 and processed against the LNP database 306. The steps (a)-(j) described supra between the PMM component 308 and the mobile network 108, and entities V-MSC 114, GMSC 312 and HLR 314, for example, apply for the landline-to-mobile and mobile-to-mobile scenarios.

It is within contemplation of the disclosed architecture that the systems and methods described herein can initially be utilized for calls that are originated and terminated in the same local area. This overcomes the IT billing concerns. However, in a more expansive application, the systems and methods described herein can be expanded nationally (and even across North America) by changing the lookup table described in the steps (f).

It is further within contemplation of the disclosed architecture that the systems and methods described herein can be deployed within a mobile network for mobile-originated calls to destination mobile devices belonging to the same cellular provider and attached to the same network.

It is still further within contemplation of the disclosed architecture that the systems and methods described herein that alternative HLR queries, except the GSM-MAP-SEND-ROUTING-INFO and the IS-4'-Map-LocationRequest, may be used to obtain the V-MSC identity without requiring the need for full mobility management routing and intelligent network triggering. Additionally, LNP can be performed via the LNP and advanced intelligent network (e.g., AIN1.0 and AIN1.1) protocols, for example.

As used in this application, the terms "component" and "system" are intended to refer to hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer or mobile terminal (cell phone).

Figure 10:
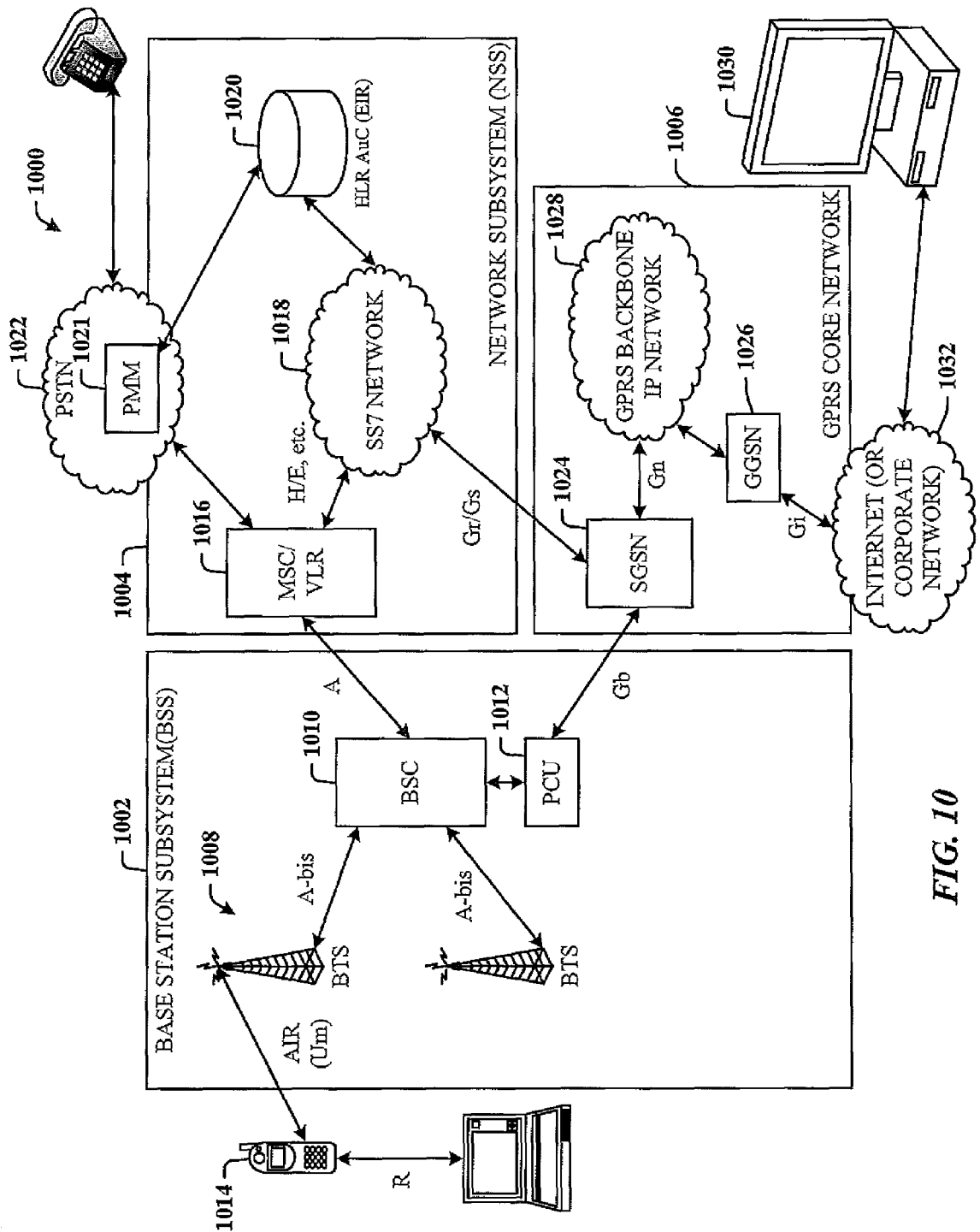
FIG. 10 illustrates an exemplary GSM network that facilitates pre-mobility management analysis in call communications according to an innovative aspect.

FIG. 10 illustrates an exemplary GSM network that facilitates pre-mobility management analysis in call communications according to an innovative aspect. The GSM system, designed as a 2G cellular communications system, utilizes time division multiple access (TDMA) technology to enable greater call capacity. Digitally-encoded speech can also be ciphered to retain call privacy. Voice calls are the primary function of the GSM system. To achieve this, the speech is digitally encoded, and later decoded using a vocoder.

GSM also supports a variety of other data services, although the performance for such data services (e.g., facsimile videotext and teletext) is slow. One data service includes SMS that allows bi-directional messaging, store-and-forward delivery, and alphanumeric messages. The overall system definition for GSM describes not only the air interface, but also the network. GSM uses 200 KHz RF channels, and are typically multiplexed to, for example, enable eight users to access each carrier.

The GSM network 1000 includes a base station subsystem (BSS) 1002, a network subsystem (NSS) 1004 and a GPRS core network 1006. The BSS 1002 can include one or more base transceiver stations (BTS) 1008 and a base station controller (BSC) 1010 connected together on an A-bis interface. The BTS and accompanying base stations (not shown) connect a cell phone to a cellular network. Base stations are all interconnected to facilitate roaming from one cell to another via a process called handover, without losing the cell connection.

A packet control unit (PCU) 1012 is shown connected to the BTS 1010 although the exact position of this can depend on the vendor architecture. The BSS 1002 is connected by the air interface Urn to a mobile terminal 1014. The BTS 1008 are the actual transmitters and receivers of radio signals. Typically, a BTS for anything other than a picocell will have several different transceivers (TRXs) which allow it to serve several different frequencies or even several different cells (in the case of sectorized base stations).

By using directional antennae on a base station, each pointing in different directions, it is possible to sectorize the base station so that several different cells are served from the same location. This increases the traffic capacity of the base station (each frequency can carry eight voice channels) while not greatly increasing the interference caused to neighboring cells (in any given direction, only a small number of frequencies are being broadcast).

The BSC 1010 provides the intelligence behind the BTS 1008. Typically, a BSC can have tens or even hundreds of BTSs 1008 under its control. The BSC 1010 handles allocation of radio channels, receives measurements from the mobile phones, and controls handovers from BTS to BTS (except in the case of an inter-MSC handover in which case control is in part the responsibility of the an MSC). One function of the BSC 1010 is to act as a concentrator such that many different low capacity connections to the BTS 1008 can become reduced to a smaller number of connections towards the MSC. Generally, this means that networks are often structured to have many BSCs 1010 distributed into regions near the BTS 1008 which are then connected to large centralized MSC sites.

The PCU 1012 can perform some of the equivalent tasks of the BSC 1010. The allocation of channels between voice and data can be controlled by the base station, but once a channel is allocated to the PCU 1012, the PCU 1012 takes full control over that channel. The PCU 1012 can be built into the base station, built into the BSC, or even in some architecture, it can be at an SGSN site.

The BSS 1002 connects to the NSS 1004 by an A interface. The NSS 1004 is shown containing an MSC 1016 connected via an SS7 network 1018 to an HLR 1020. The AuC and the EIR, although technically separate functions from the HLR 1020, are shown together since combining them can be performed in the network. The HLR 1020 can interface to a preliminary mobility management (PMM) component 1021 that facilitates pre-mobility analysis in accordance with the disclosed architecture.

The combination of a cell phone 1014 and a SIM card (not shown) creates a special digital "signature" that includes a subscriber number which is sent from the cell phone 1014 to the nearest BTS 1008 asking that the subscriber of a particular network be allowed to use the network. The request is passed on along the network of BTS 1008 to the heart of a cellular network, the MSC 1016. The MSC also routes all incoming and outgoing calls to and from the fixed-line networks or other cellular networks. When the user wants to make an outgoing call, another section of the MSC called the VLR checks whether the caller is actually allowed to make that call. For example, if the caller is barred for international dialing, a message to that effect will be generated by the VLR, sent along the network, and almost instantly back to the cell phone.

The NSS 1004 also contains the component called HLR 1020 that provides the administrative information required to authenticate, register and locate the caller as that network's subscriber. Once the HLR 1020 has received a log-on request, the HLR 1020 immediately checks the special "signature" contained in the request against the HLR special subscriber database. If the subscription is current, the MSC 1016 sends a message back to the phone via the network of BTS 1008 that indicates the caller is allowed to access the network. The name or code of that network will appear on the LCD screen of the cell phone 1014. Once this network "name" message appears on the phone LCD screen, it means the caller is connected to the network and able to make and receive calls.

The HLR 1020 registers which MSC the cell phone is currently connected to, so that when the network MSC 1016 needs to route an incoming call to the cell phone number, it will first check the HLR 1020 to see which MSC is currently serving the cell phone. Periodically, the cell phone will send a message to the MSC indicating where it is, in a process called polling. The combination of the tracking function and the caller's unique digital signature allows the MSC 1016 to route that call to the precise base station the cell phone happens to be connected to, and then exclusively to the cell phone, even if a number of other subscribers are simultaneously connected to that base station.

When traveling to another MSC coverage area while driving, for example, the HLR 1020 is automatically updated, and continues to monitor where exactly it should route the calls should the caller then move within range of another base station. This routing procedure means that out of hundreds of thousands of subscribers, only the correct cell phone will ring when necessary.

The NSS 1004 has a direct connection to the PSTN (public switched telephone network) 1022 from the MSC 1016. There is also a connection to from the NSS 1004 to the GPRS core network 1006 via a Gr/Gs interface although this is optional and not always implemented. The illustrated GPRS Core Network 1006 is simplified to include a SGSN 1024 (connected to the BSS 1002 by the Gb interface) and a GGSN 1026. The SGSN 1024 and the GGSN 1026 are connected together by a private IP network 1028 called a GPRS backbone shown as the Gn reference point. A computer 1030 is depicted as connecting to the core network 1006 via an Internet or corporate network 1032.

Some voice mail systems are linked to a network SMS Center (SMSC), a special facility that handles short messages. The SMSC generates the special SMS message that notifies the caller when they have mail waiting in a Mailbox. SMS messages can be received on an SMS-capable cell phone even while the caller is on a voice call. This is because the SMS messages are sent on a different radio frequency, the GSM data channel, than voice calls, so that the two never interfere.

Although applicable to any existing or yet to be developed wireless telecommunications network, aspects of the disclosed architecture have been described with reference to the GSM air interface that uses general packet radio service (GPRS) as an enabling bearer. As indicated above, examples of other suitable wireless and radio frequency data transmission systems include networks utilizing TDMA, frequency division multiple access (FDMA), wideband code division multiple access (WCDMA), orthogonal frequency division multiplexing (OFDM), and various other 2.5 and 3G (third generation) and above wireless communications systems. Examples of other suitable enabling bearers include universal mobile telecommunications system (UMTS), enhanced data rates for global evolution (EDGE), high speed downlink packet access (HSDPA), and similar communications protocols.

Figure 11:
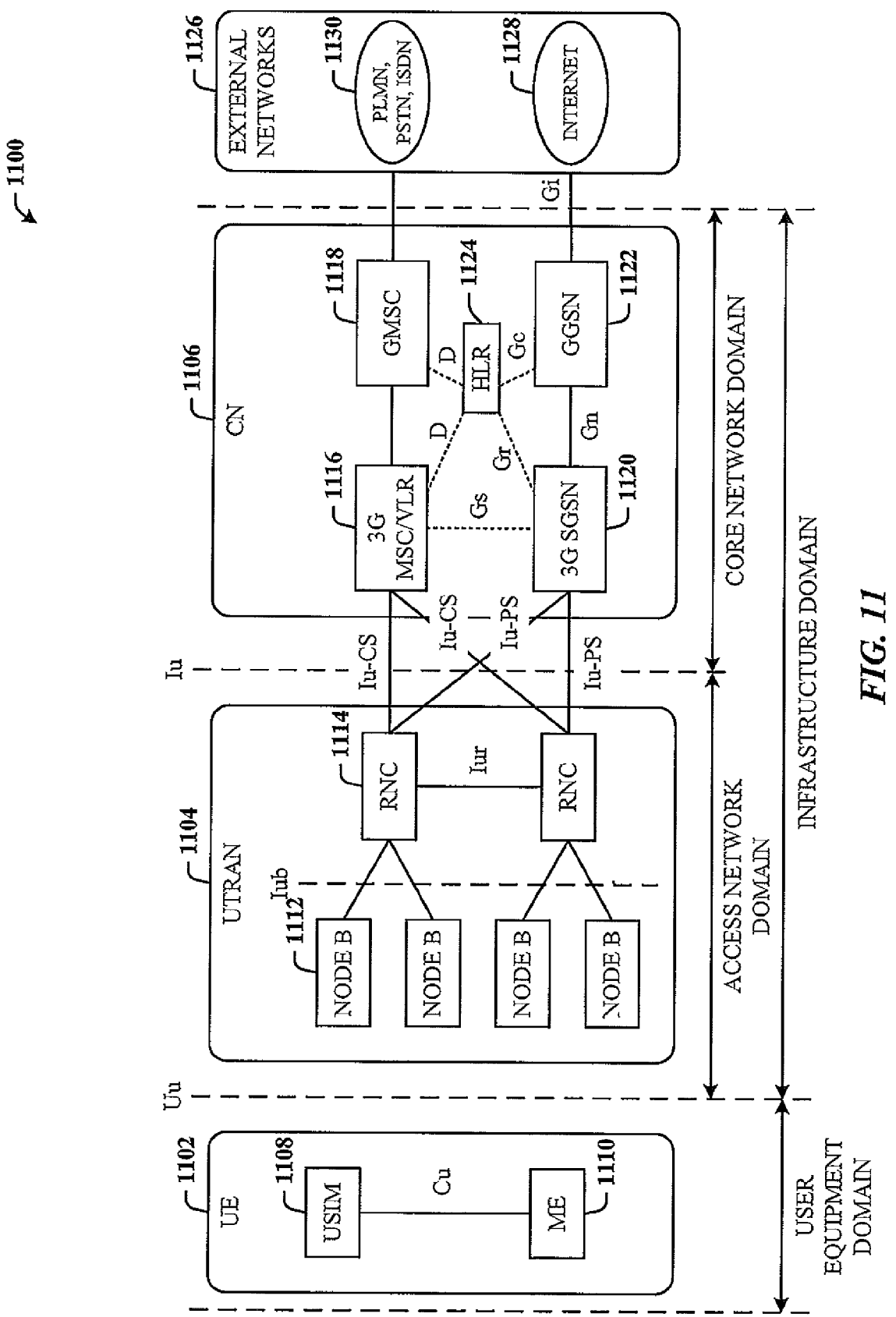
FIG. 11 illustrates an exemplary UMTS network that facilitates pre-mobility management analysis in call communications according to an innovative aspect.

FIG. 11 illustrates an exemplary UMTS network 1100 that facilitates pre-mobility management analysis in call communications according to an innovative aspect. The architecture is based on the 3GPP (Third Generation Partnership Project) Release 99 specification. However, it is to be understood that the subject innovation can be applied to any UMTS telecommunications architecture, including by way of example, Release 5 (R5) and, R5 and Release 6 (R6) 3GPP standards. UMTS offers teleservices (e.g., speech and/or SMS-Short Message Service) and bearer services, which provide the capability for information transfer between access points. Negotiation and renegotiation of the characteristics of a bearer service can be performed at session or connection establishment, and during an ongoing session or connection. Both connection oriented and connectionless services can be offered for point-to-point and point-to-multipoint communications.

The following frequencies 1885-2025 MHz and 2110-2200 MHz can be allocated for UMTS use. However, the innovative aspects described herein can also be applied to other frequency bands. UMTS can be used in other cellular/PCS frequencies, for example, 825-849 MHz and 869-894 MHz, 1850-1910 MHz and 1930-1990 MHz. Bearer services can have different QoS (quality-of-service) parameters for maximum transfer delay, delay variation and bit error rate. Offered data rate targets are: 144 kbps satellite and rural outdoor; 384 kbps urban outdoor; and 2048 kbps indoor and low range outdoor.

UMTS network services can have different QoS classes for four types of traffic: conversational class (e.g., voice, video telephony, video gaming); streaming class (e.g., multimedia, video on demand, webcast); interactive class (e.g., web browsing, network gaming, database access); and background class (e.g., email, SMS, downloading).

UMTS can also support have a virtual home environment, which is a concept for portability across network boundaries and between terminals in a personal service environment. Personal service environment means that users are consistently presented with the same personalized features, user interface customization and services in whatever network or terminal, wherever the user may be located. UMTS also includes network security and location based services.

The UMTS network 1100 can consist of three interacting domains; a user equipment (UE) domain 1102, a UMTS Terrestrial Radio Access Network (UTRAN) domain 1104, and a core network (CN) domain 1106. The UTRAN domain 1104 is also referred to as the access network domain and the CN 1106 is referred to as the core network domain, the both of which comprise an infrastructure domain.

The UE domain 1102 includes a USIM (user services identity module) domain and an ME (mobile equipment) domain. User equipment is the equipment used by the user to access UMTS services. In the UE domain 1102, the UMTS IC card is the USIM 1108 which has the same physical characteristics as GSM SIM (subscriber identity module) card. The USIM interfaces to ME 1110 via a Cu reference point. Functions of the USIM include: support of one USIM application (and optionally, more than one); support of one or more user profiles on the USIM; update of USIM specific information over the air; security functions; user authentication; optional inclusion of payment methods; and optional secure downloading of new applications.

UE terminals work as an air interface counter part for Node-B devices of the access network and have many different types of identities. Following are some of the UMTS identity types, which are taken directly from GSM specifications: international mobile subscriber identity (IMSI); temporary mobile subscriber identity (TMSI); packet temporary mobile subscriber identity (P-TMSI); temporary logical link identity (TLLI); mobile station ISDN (MSISDN); international mobile station equipment identity (IMEI); and international mobile station equipment identity and software version number (IMEISV).

A UMTS mobile station (MS) can operate in one of three modes of operation. A PS/CS mode of operation is where the MS is attached to both the PS (packet-switched) domain and CS (circuit-switched) domain, and the MS is capable of simultaneously operating PS services and CS services. A PS mode of operation is where the MS is attached to the PS domain only, and can only operate services of the PS domain. However, this does not prevent CS-like services from being offered over the PS domain (e.g., VoIP). In a third CS mode of operation, the MS is attached to the CS domain only, and can only operate services of the CS domain.

The UTRAN 1104 provides the air interface access method for the UE domain 1102. The reference point between the UE domain and the infrastructure domain is the Uu UMTS radio interface. The access network domain provides the physical entities that manage resources of the access network and facilitates access to the core network domain. In UMTS terminology, a base station of the access network domain is referred as a Node-B device 1112, and control equipment for Node-B devices is called a radio network controller (RNC) 1114. The interface between the Node-B device and the RNC 1114 is the Iub interface. The interface between two RNCs is called the Iur interface.

The functions of Node-B devices include: air interface transmission/reception; modulation and demodulation; CDMA (Code Division Multiple Access) physical channel coding; micro diversity; error handing; and closed loop power control. The functions of the RNC include: radio resource control; admission control; channel allocation; power control settings; handover control; macro diversity; ciphering; segmentation and reassembly; broadcast signaling; and open loop power control.

Wideband CDMA (WCDMA) technology was selected for UTRAN air interface. UMTS WCDMA is a direct sequence CDMA system where user data is multiplied with quasi-random bits derived from WCDMA spreading codes. In UMTS, in addition to channelization, codes are used for synchronization and scrambling. WCDMA has two basic modes of operation: frequency division duplex (FDD) and time division duplex (TDD).

The Core Network is divided in circuit-switched and packet-switched domains. Some of the circuit-switched elements are a MSC/VLR 1116, and GMSC 1118. Packet-switched elements include a serving GPRS support node (SGSN) 1120 and gateway GPRS support node (GGSN) 1122. Some network elements such as an EIR (equipment identity register) (not shown), HLR (home location register) 1124, VLR and AuC (authentication center) (not shown) can be shared by both domains.

A function of the CN 1102 is to provide switching, routing and transit for user traffic. The CN 1102 also contains the databases and network management functions. The basic CN architecture for UMTS is based on the GSM network with GPRS (general packet radio service) capability. All equipment is modified for UMTS operation and services. The radio access network has several interfaces which can be configured and dimensioned. The CN 1106 interfaces to the radio access domain via an Iu interface. An Iu-CS (circuit-switched) reference point interfaces an RNC of the access network to the MSC/VLR entity 1116 of the CN 1106 for voice from/to the MSC/VLR 1116. An Iu-PS (packet-switched) reference point interfaces an RNC of the access network to the SGSN entity 1120 of the CN 1106 for data from/to the SGSN 1120.

In the CN 1106, a Gs interface is provided between the MSC/VLR 1116 and the SGSN. A Gn interface is provided between the SGSN 1120 and the GGSN 1122. A D interface is provided between the MSC/VLR 1116 and the HLR 1124, and the HLR 1124 and the GMSC 1118. A Gr interface is provided between the SGSN 1120 and the HLR 1124. A Ge interface is provided between the GGSN 1122 and the HLR 1124.

The CN 1106 provides the interface from the UE domain 1102 to external networks 1126 such as the Internet 1128 via a Gi interface from the GGSN 1122, and other networks 1130 via the GMSC 1118, which can include a PLMN (public land mobile network), PSTN and ISDN (integrated service digital network) networks.

Asynchronous Transfer Mode (ATM) is defined for UMTS core transmission. ATM Adaptation Layer type 2 (AAL2) handles circuit-switched connection, and packet connection protocol AAL5 is designed for data delivery.

The architecture of the CN 1106 can change when new services and features are introduced. Number Portability Database (NPDB), for example, can be used to enable a user to change the network while keeping their old phone number. A gateway location register (GLR) can be employed to optimize the subscriber handling between network boundaries. Additionally, the MSC/VLR and SGSN can merge to become a UMTS MSC.

Paired uplink and downlink channel spacing can be 5 MHz and raster is 200 kHz. An operator can use 3-4 channels (2×15 MHz or 2×20 MHz) to build a high-speed, high-capacity network. Frequencies 1900-1920 MHz and 2010-2025 MHz can be utilized for TDD and TD/CDMA. Unpaired channel spacing can be 5 MHz and raster is 200 kHz. Transmit and receive are not separated in frequency. Frequencies such as 1980-2010 MHz and 2170-2200 MHz can be employed for satellite uplink and downlink.

The disclosed invention finds application to EDGE (Enhanced Data rates for GSM Evolution) technology. EDGE is effectively the final stage in the evolution of the GSM standard, and uses a new modulation schema to enable theoretical data speeds of up to 384 Kbps within the existing GSM spectrum. EDGE is an alternative upgrade path towards 3G services for operators, without access to a new spectrum.

The architecture of the invention also finds application to a hierarchical cell structure (HCS). HCS is the architecture of a multi-layered cellular network where subscribers are handed over from a macrocell to a microcell, and even further, to a picocell, depending on the current network capacity and the needs of the subscriber.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for facilitating call communications, the method comprising:
   generating, at a switching component of a telecommunications network, a number portability (NP) request based on a call of an originating device to a destination device;
   receiving, at a management component, the request or a response to the request; and
   facilitating, at the management component, return to the switching component of a location routing number (LRN) for a visited mobile switching center (V-MSC) that serves the destination device, by the management component:
      generating a Send Routing Info for Location Services (SRI for LCS) message;
      sending the SRI for LCS message to a home location register (HLR) to retrieve an address for the V-MSC, the SRI for LCS message being used to retrieve the V-MSC address without needing to trigger a subsequent query by the HLR to the V-MSC;
      receiving, in reply to the SRI for LCS message, the V-MSC address from the HLR; and
      translating the V-MSC address into a V-MSC LRN based upon a lookup table in the management component.

2. The method of claim 1, further comprising routing, at the switching component, the call to the V-MSC based on the LRN, wherein the V-MSC performs gateway MSC (G-MSC)-type functionality for the call.

3. The method of claim 1, wherein the management component is a part of the switching component.

4. The method of claim 1, wherein the switching component is a landline switch and the method further comprises receiving, at the landline switch, the call from a landline telecom device, and routing, at the landline switch, the call through the V-MSC to a Global System for Mobile communications (GSM) mobile destination device based on the LRN.

5. The method of claim 1, wherein the switching component is a landline switch and the method further comprises receiving, at the landline switch, the call from a landline telecom device, and routing, at the landline switch, the call through the V-MSC to an IS-41-based mobile destination device based on the LRN.

6. The method of claim 1, wherein the switching component is an originating mobile switching center (O-MSC) switch and the method further comprises receiving, at the O-MSC switch, the call from a mobile originating device, and routing, at the O-MSC switch, the call through the V-MSC to a Global System for Mobile communications (GSM) mobile destination device based on the LRN.

7. The method of claim 1, wherein the switching component is an originating mobile switching center (O-MSC) switch and the method further comprises receiving, at the O-MSC switch, the call from a mobile originating device, and routing, at the O-MSC switch, the call through the V-MSC to an IS-41-based mobile destination device based on the LRN.

* * * * *